United States Patent
You et al.

(10) Patent No.: US 8,433,282 B2
(45) Date of Patent: Apr. 30, 2013

(54) EMERGENCY SERVICE HANDOVER METHOD

(75) Inventors: Shilin You, Shenzhen (CN); Jiyan Cai, Shenzhen (CN); Zhenwu Hao, Shenzhen (CN); Zhendong Li, Shenzhen (CN); Zhiming Yu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 116 days.

(21) Appl. No.: 13/062,159

(22) PCT Filed: Dec. 18, 2008

(86) PCT No.: PCT/CN2008/073584
§ 371 (c)(1),
(2), (4) Date: Mar. 3, 2011

(87) PCT Pub. No.: WO2010/025602
PCT Pub. Date: Mar. 11, 2010

(65) Prior Publication Data
US 2011/0165856 A1    Jul. 7, 2011

(30) Foreign Application Priority Data
Sep. 5, 2008    (CN) .......................... 2008 1 0141850

(51) Int. Cl.
*H04M 11/04*    (2006.01)
(52) U.S. Cl.
USPC .................... 455/404.1; 455/436; 370/331
(58) Field of Classification Search .............. 455/404.1, 455/436; 370/331
See application file for complete search history.

(56) References Cited

U.S. PATENT DOCUMENTS 8,064,907 B2 * 11/2011 Gallagher et al. ......... 455/435.1
2011/0141979 A1 * 6/2011 Keller et al. ................ 370/328

FOREIGN PATENT DOCUMENTS

| CN | 101137197 A | 3/2008 |
|---|---|---|
| CN | 101227677 A | 7/2008 |
| WO | WO 2008/023162 A2 | 2/2008 |

OTHER PUBLICATIONS

International Search Report and Written Opinion of the International Searching Authority for International Application No. PCT/CN2008/073584, mailed Apr. 9, 2009. (English translation provided.)
International Preliminary Report on Patentability for International Application No. PCT/CN2008/073584, issued Mar. 8, 2011. (English translation provided.)

* cited by examiner

*Primary Examiner* — Amancio Gonzalez
(74) *Attorney, Agent, or Firm* — Li & Cai Intellectual Property (USA) Office

(57) ABSTRACT

The present invention discloses an emergency service handover method which is applied in a single radio voice service system. A UE has established an emergency session between an IMS domain and an emergency call center via LTE/SAE network, wherein the emergency session is anchored to a service centralization and continuity application server, SCC AS, at a visited location. When MSC obtains information that the UE having established the emergency session needs to be switched to a CS domain, an enhanced MSC initiates a session establishment request to the visited SCC AS for performing a handover from the IMS domain to the CS domain on a service layer.

13 Claims, 6 Drawing Sheets

EMERGENCY SERVICE HANDOVER METHOD

Cross-Reference To Related Applications

This application is the U.S. National Stage filing under 35 U.S.C. §371 of International Application No. PCT/CN2008/073584, filed Dec. 18, 2008, which claims benefit of Chinese Patent Application No. 200810141850.8, filed Sep. 5, 2008.

FIELD OF THE INVENTION

The present invention relates to the communication technical field, in particular to an emergency service handover method under a frame of next generation mobile communication network long term evolution (LTE for short)/system architecture evolution (SAE for short).

BACKGROUND OF THE INVENTION

For ensuring the continuity of voice service between a circuit switched (CS for short) domain and an internet protocol (IP for short) multimedia subsystem (IP Multimedia Core Network Subsystem, IMS for short) domain, traditional solution is as shown in FIG. 1, that is the solution of voice call continuity (VCC for short).

FIG. 1 is a principle diagram of VCC in the existing IMS. In FIG. 1, dual mode user equipment (UE for short) is successfully registered in both the CS domain and the IMS network. When initiating voice service in the CS domain or the IMS domain network, the UE is anchored to the service centralization and continuity application server (SCC AS for short) in IMS network, at this time the UE has two known SCC AS numbers, a session transfer URI (STI for short) and a session transfer number (STN for short), wherein the STI is used to indicate switching the user session from the CS domain to the IMS domain or a packet switched (PS for short) domain on a service layer; and the STN is used to indicate switching the user session from the IMS domain to the CS domain on a service layer. When UE prepares to switch an established session from CS domain to IMS domain or from one packet switched domain to another packet switched domain, the US initiates a session request to the SCC AS in the IMS network by using the STI as an indication. After receiving the session request, the SCC AS switches the access of established session from the CS to from the PS or from one PS to another PS. Similarly, when the UE initiates a voice service in the IMS network and prepares to be switched from the IMS domain to the CS domain, the UE uses the STN as a called number in the CS domain and initiates a call for the SCC AS. After the SCC AS receives the session request, the voice service is switched from an IP access to the CS domain, therefore the entire switch is completed.

Above description is for the realization principle of traditional VCC, wherein the dual mode UE must simultaneously support the working mode of dual radio, that is, the dual mode UE can simultaneously perform voice call in the IMS domain and the CS domain.

With the flat development of network architecture and the emergence of various high-speed wideband movable access modes, the mobile communication network is impelled to provide next generation architecture concept of LTE/SAE, including that the evolved radio communication system is enabled to provide higher transmission rate, shorter transmission delay, and lower cost and at the same time support the mobility between the access systems in $3^{rd}$ generation partnership project (3GPP for short), the mobility between 3GPP access system and non-3GPP access system and the like. At the same time, LTE/SAE will also be used as one access manner of IMS domain to support the existing VCC function. Due to the large energy consumption of mobile phone battery under dual mode and strong mobility management ability of LTE/SAE per se and the like, a single radio voice call continuity (SRVCC for short) is proposed. The principle architecture for realizing SRVCC solution is provided hereinafter.

FIG. 2 is a related SRVCC principle diagram based on SAE network architecture. As shown in FIG. 2, corresponding network elements of SAE comprises:

an evolved universal terrestrial radio access network (E-UTRAN for short): evolved radio access network, that is next generation radio access network, which can provide higher uplink and downlink speed, lower transmission delay and more reliable radio transmission;

a mobility management entity (MME): control plane functional entity, which is in charge of managing and storing UE context (such as UE/user identifier, mobile management status, user safety parameters and the like), allocates temporary identifier for the user, and is responsible for user acknowledge when the UE resides on the above-mentioned tracking area or network;

a system architecture evolution gateway (SAEGW for short): user plane functional entity, for user plane data route process, which is divided into a serving SAEGW (SGW for short) and a packet data network gateway (PDNGW for short), wherein SGW is mobile anchor points between the SAE system and the traditional 3GPP system and between E-UTRANs; PDN GW is used for terminating the downlink data of UE in idle state; and when the downlink data transmitted to the UE is arrived, PDN GW is used for initiating paging, managing and storing UE context (such as IP bearer service parameters and network interior routing information).

The existing 2G/3G mobile network comprises:

a radio access network comprising a 2G GSM EDGE radio access network (GERAN for short) and a 3G universal terrestrial radio access network (UTRAN for short); core network comprising a circuit switched domain network element (MSC) and a packet switched domain network element serving GPRS support node (SGSN for short), wherein MSC provides circuit voice service, circuit data service and short message service, and SGSN is connected with SAE GW in LTE/SAE and is used for providing packet switched domain service;

home subscriber server (HSS for short) managing the data of circuit switched (CS) domain, packet switched (PS) domain and multimedia subsystem (IMS) domain.

The IMS network comprises:

core network elements of core network element call session control function (CSCF for short), media gateway control function (MGCF for short) and the like, and an SCC AS for realizing VCC function.

The UE can access the IMS domain via LTE/SAE. The IMS domain can provide the IMS service for the UE. The UE also can access the IMS network via the PS network (that is, GERAN/UTRAN and SGSN parts as shown in FIG. 2) of 2G and 3G. The IMS network can provide the CS service, such as voice service, for UE.

The existing network in the prior art is described in the above. In order to realize the continuity of single radio voice service, the existing MSC has been enhanced. The enhanced MSC is connected with the core network element MSC of the CS domain of 2G/3G, core network element of the PS domain of 2G/3G and the MME of the LTE/SAE network, and controls the handover between the LTE/SAE network and the 2G/3G network. The enhanced MSC also can be connected with the SCC AS via the MGCF in IMS domain network to ensure that all call can be anchored to the SCC AS in the IMS domain and ensure realization of the basic functions of the VCC, wherein the interface with the MSC adopts an E interface, and the E interface herein uses a mobile application part (MAP) signaling. The enhanced MSC and the MSC, performing the handover using inter-office handover mode of the CS domain, has the E interface used therebetween, and if there is only the enhanced MSC, the message interaction therebetween will be realized interiorly.

Telecommunication network must provide emergency voice call service. When user dials emergency service number or uses the default emergency service number stored in terminal device, or initiates the emergency service by using emergency service identifier, the emergency service will be connected by the network to the local emergency communication acceptance center (such as police, fire alarm, medical aid, rescue and the like).

In prior art, the operation that the emergency service visits the domain is realized in the way that: the emergency service accesses, by a proxy-call session control function (P-CSCF), to an emergency-call session control function (E-CSCF), and further accesses, by the E-CSCF, to a local emergency service center (Presentation-Service Access Point, PSAP for short), and thereby the emergency service is realized.

FIG. 1 is a principle diagram of the VCC under the existing IMS, which is used for realizing the continuity of single radio emergency service. As shown in FIG. 1, the CSCF is the E-CSCF, and the SCC AS is an application server for realizing the continuity of emergency service under the E-CSCF. Such server is located in visit domain, and is variable for each user. The SCC AS is located in home domain, and is fixed for each user.

The enhanced MSC accesses the E-CSCF in the visited IMS domain; the E-CSCF accesses the visited SCC AS; and the PDN GW/S-GW accesses the visited IMS domain.

FIG. 2A is a flow chart of prior art realizing to switch the access from LTE/SAE network to the access from the CS domain based on the SRVCC principle diagram in FIG. 2. As shown in FIG. 2A, a session has been established in the IMS between single UE and UE-B, and is anchored to the visited SCC AS to perform handover from the IMS domain to the CS domain. The prior technical procedure mainly comprises the following steps (S201-S218):

Step S201, after receiving the E-UTRAN measurement request of the LTE/SAE radio network element, the UE sends a measurement report, and the measurement report carries the information of adjacent cell;

Step S202, the E-UTRAN initiates a relocation request message to the MME according to the information of the adjacent cell in the measurement report;

Step S203, the MME sends a forward relocation request message to the enhanced MSC according to the information of the relocation request message; the forward relocation request message carries the domain transfer identifier (STN) of the user and the integrated service digital network (ISDN) number of the user; STN and ISDN numbers are configured according to the user information and the MME, and are obtained via the HSS;

Step S204, the enhanced MSC sends a MAP preparation handover request message to the MSC;

Step S205, the MSC sends a handover requirement message to GERAN/UTRAN, and the GERAN/UTRAN replies a handover requirement acknowledge message to the MSC;

Step S206, the MSC replies a MAP preparation handover acknowledge message to the enhanced MSC, wherein the message carries a handover number (HO#) which is allocated by the MSC;

Step S207, the enhanced MSC sends an initial address message of ISDN user part (ISUP) signaling to MSC according to the handover number, and MSC returns the address complete message of ISUP to the enhanced MSC;

Step S208, the enhanced MSC sends an initial address message of ISUP to the SCC AS via the MGCF and the CSCF in the IMS domain, the message carrying STN and ISDN numbers, wherein, the ISDN number and STN indicates that the SCC AS switches the session of the corresponding user from the IMS domain to the CS domain on service layer, and SCC AS sends the reply message to the enhanced MSC; or the enhanced MSC directly sends an SIP session request message to the SCC AS, and the SIP session request message carries STN, or the ISDN number of the user is switched to a telecommunication universal resource identifier (tel URI), the SCC AS replies the SIP successful message (such as the successful message of the SIP can be represented as 200 OK) to the enhanced MSC;

The enhanced MSC sends the SIP session request message to the SCC AS directly or via the ISUP initial address message in the above-mentioned steps, representing to initiate voice service continuity handover request to the SCC AS, and switch the voice service continuity handover request from the IMS domain to the CS domain on the service layer;

Step S209, the enhanced MSC replies the forward relocation response message to the MME;

Step S210, the MME replies the relocation response message to the E-UTRAN;

Step S211, the E-UTRAN replies the relocation command message to the UE;

Step S212, the US sends handover access message to the target GERAN/UTRAN;

Step S213, after detecting the handover, the GERAN/UTRAN sends a message of having detected the handover to the MSC;

Step S214, the MSC sends a process access signaling message of the MAP to the enhanced MSC, and notifies the MSC that user terminal performs the access from the CS domain;

Step S215, the UE sends a handover completion message to the GERAN/UTRAN;

Step S216, the GERAN/UTRAN sends the handover completion message to the MSC;

Step S217, the MSC sends MAP_SEND_END_SIGNAL message (MAP sending end signal) to the enhanced MSC, and the message notifies the enhanced MSC that the user terminal has been switched to the CS domain;

Step S218, the MSC replies the ISUP response message (corresponding to the ISUP initial address message in step S207) to the enhanced MSC;

The specific handover comprises the following two conditions: one condition is sending the handover request to the MSC via the enhanced MSC, and the other condition is switching to the enhanced MSC without switching to other MSC. In case of the second condition (hereafter referred to as integrated-configuration), steps S204, S206, S207, S214, S217 and S218 will be realized in the enhanced MSC.

According to the above-mentioned steps, the access of the corresponding IMS session from the LTE/SAE network is successfully switched to from the CS domain. The handover comprises two handover procedures: one handover procedure is the above-mentioned step S208 in which the session is switched from the IMS domain to the CS domain on the service layer, and the other handover procedure is the steps, except step S208, in which the access of the session is switched from the LTE/SAE network to from the CS network.

From the above description, it can be seen that the STN in step S208 is obtained from the HSS by the MME in step S203. Since the emergency service is completed in the visited domain, in case that the step S208 adopts the STN obtained from the HSS, the SCC AS in the home domain will fails to associate the session due to non-existence of the emergency service information of the UE, thereby which makes the handover of the entire service failed, and can not ensure the continuity of the emergency service in the single radio channel.

SUMMARY OF THE PRESENT INVENTION

The above-mentioned emergency service can not ensure the continuity of the service in the visited domain, and the STN is obtained from the home domain HSS, and the bearer of the handover is established wrongly to the SCC AS in the home domain, which results in that the SCC AS in the home domain can not recognize the session and finally results in that the handover is failed. The present invention aims to provide an improved emergency service handover scheme to solve at least one of above-mentioned problems.

In order to realize the above-mentioned purposes of the present invention, an emergency service handover method is provided according to the present invention.

The emergency service handover method according to the present invention comprises: when an enhanced mobile switching center (MSC) obtains the information that the UE having established emergency session needs to be switched to the CS domain, the enhanced MSC initiates a session establishment request to a visited SCC AS for performing a handover from the IP multimedia subsystem domain to the circuit switched domain on a service layer.

Further, an emergency session transfer number (STN) corresponding to the SCC AS in the visited location is preset in the enhanced MSC and the enhanced MSC initiates the session establishment request to the visited SCC AS according to the emergency STN.

Further, an emergency session transfer number (STN) corresponding to the SCC AS in the visited location is preset in an MME, the emergency session transfer number (STN) is sent to the enhanced MSC in a handover request, and the enhanced MSC initiates the session establishment request to the visited SCC AS according to the emergency STN.

Further, in the process of switching from the IP multimedia subsystem domain to the circuit switched domain on the service layer, the enhanced MSC notifies the CS domain' MSC, by using an emergency identifier, that the handover is a handover regarding emergency call.

Further, the enhanced MSC is an independent network element or is integrated with the MSC.

Further, the method that the enhanced MSC obtains the information that the UE having established the emergency session needs to be switched to the CS domain is as follows:

the user terminal (UE) sends the domain handover session information, which carries the emergency identifier, to the mobility management entity via the evolved universal terrestrial radio access network E-UTRAN;

the MME sends the domain handover session information which carries the emergency identifier to the enhanced MSC.

Further, the method that the enhanced MSC obtains the information that the UE having established the emergency session needs to be switched to the CS domain is as follows:

the MME receives the session handover request from the UE, determines the session to be switched is an emergency service according to the condition that the session bearer is an emergency bearer or the borne information obtained from a policy server is the emergency service, adds an emergency handover identifier in the handover request and forwards the handover request to the enhanced MSC.

Further, the methods that the enhanced MSC obtains the information that the UE having established the emergency session needs to be switched to the CS domain comprises:

when receiving the information of the relocation request message from the MME, the enhanced MSC initiates a session type request message to the UE directly or via the MME;

the UE returns the session type request response message, which carries the emergency identifier, to the enhanced MSC.

Further, before the enhanced MSC obtains the information that the UE having established the emergency session needs to be switched to the CS domain, the LTE/SAE network sends an emergency STN of the visited SCC AS to the UE via broadcast.

When receiving the information of the relocation request message from the MME, the enhanced MSC initiates the session type request message to the UE directly or via the MME.

The UE returns the session type request response message, which carries the emergency identifier and the emergency STN, to the enhanced MSC.

In virtue of at least one of the above-mentioned technical schemes, after the present invention determines the switched session as the emergency service via the enhanced MSC, the enhanced MSC selects the emergency STN, and sends the emergency service handover request to the SCC AS in the visited location, therefore the handover is ensured to be preformed correctly instead of sending the above to the SCC AS in the home location.

DETAILED DESCRIPTION

General Description of Functions

The embodiment of the present invention provides a method for realizing the continuity of the single radio emergency service under SAE and 2G/3G network architectures. In the method, when the enhanced mobile switching center, MSC, obtains information that a UE having established an emergency session needs to be switched to a CS domain, the enhanced MSC initiates a session establishment request to a visited SCC AS for performing a handover from an IP multimedia subsystem domain to a circuit switched domain on a service layer.

The preferable embodiments of the present invention will be detailed hereinafter in connection with the drawings. It should be illustrated is that if no conflict, the embodiments of the present invention and the characteristics in the embodiments can be inter-combined.

The following descriptions are only (a plurality of) illustrative embodiments, which are not used to restrict the disclosed scope, the applicability or the configuration of the present invention. On the contrary, the following descriptions of (a plurality of) illustrative embodiments can provide the descriptions of realizing the disclosed and illustrated embodiments for those skilled in the art. What should be understood is that the functions and allocations of the elements can be varied within the spirit and the scope of the present invention described in claims.

Embodiment I

The embodiment of the present invention provides a handover method for realizing to switch the access from the LTE/SAE network to the access from the CS domain. The prerequisite of the embodiment of the present invention is that the UE established an emergency session in the IMS domain with an emergency call center via the LTE/SAE network, and the session is anchored to the SCC AS in the visited location.

Figure 1:
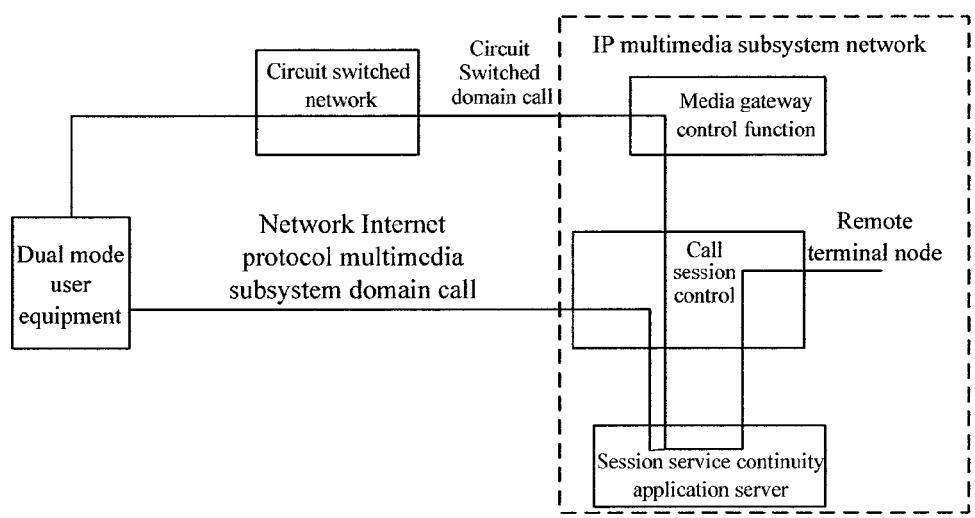
FIG. 1 is a schematic diagram of VCC of IMS in the related art.
Figure 2:
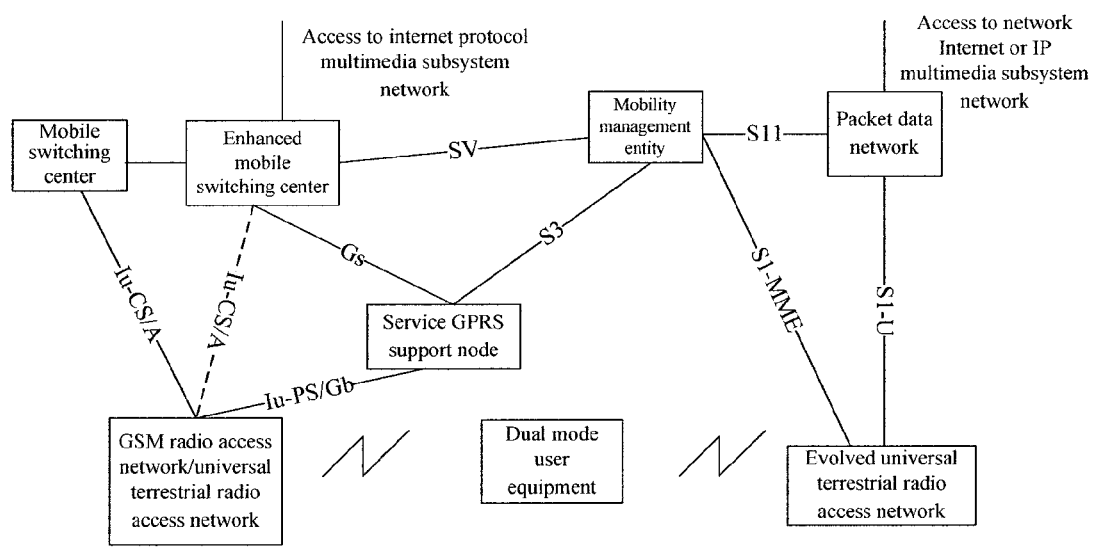
FIG. 2 is a schematic diagram of prior SRVCC based on the SAE network architecture.
Figure 2A:
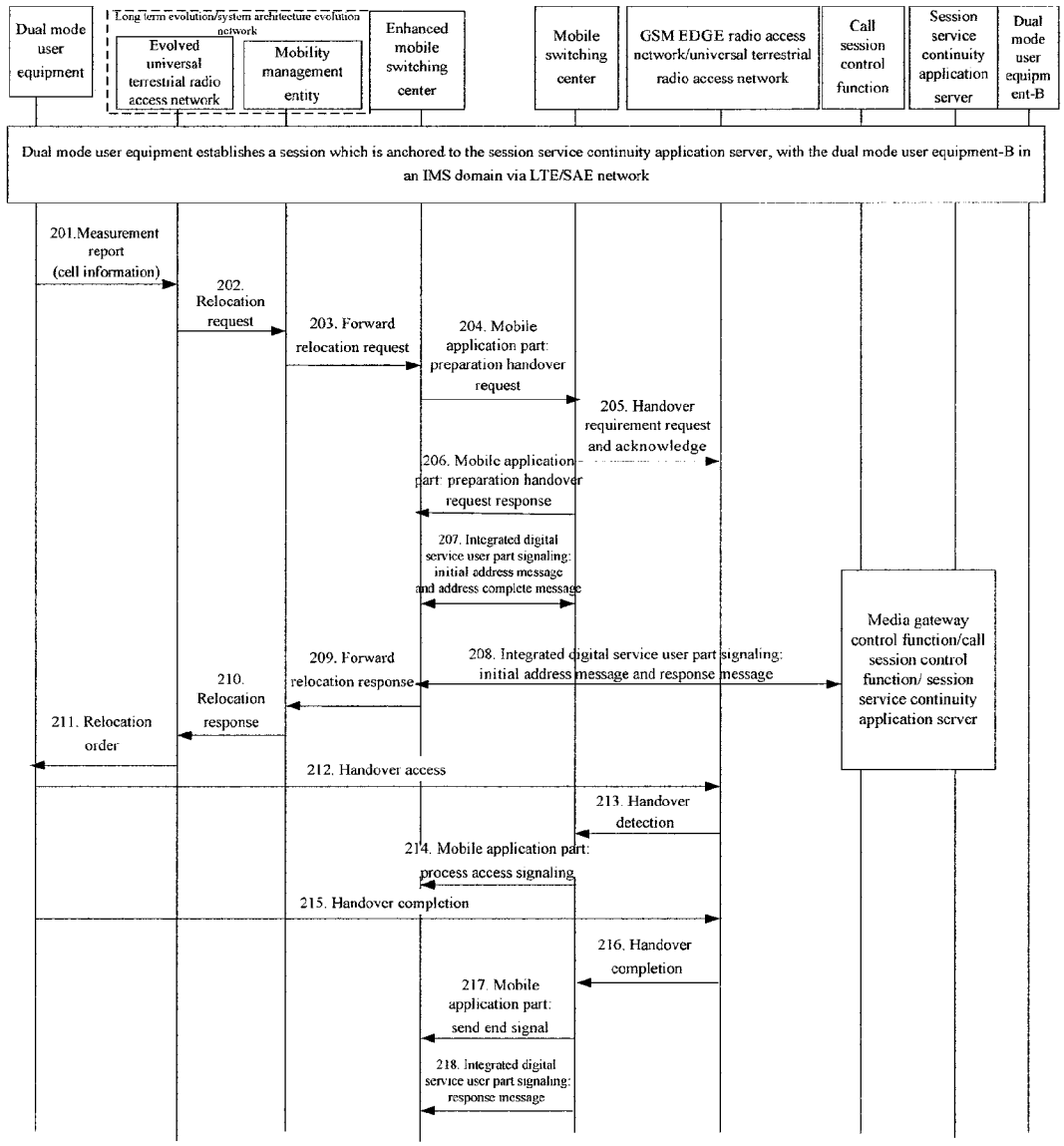
FIG. 2A is a flow chart of prior art realizing to switch the access from the LTE/SAE network to the access from the CS domain based on SRVCC schematic diagram in FIG. 2.
Figure 3:
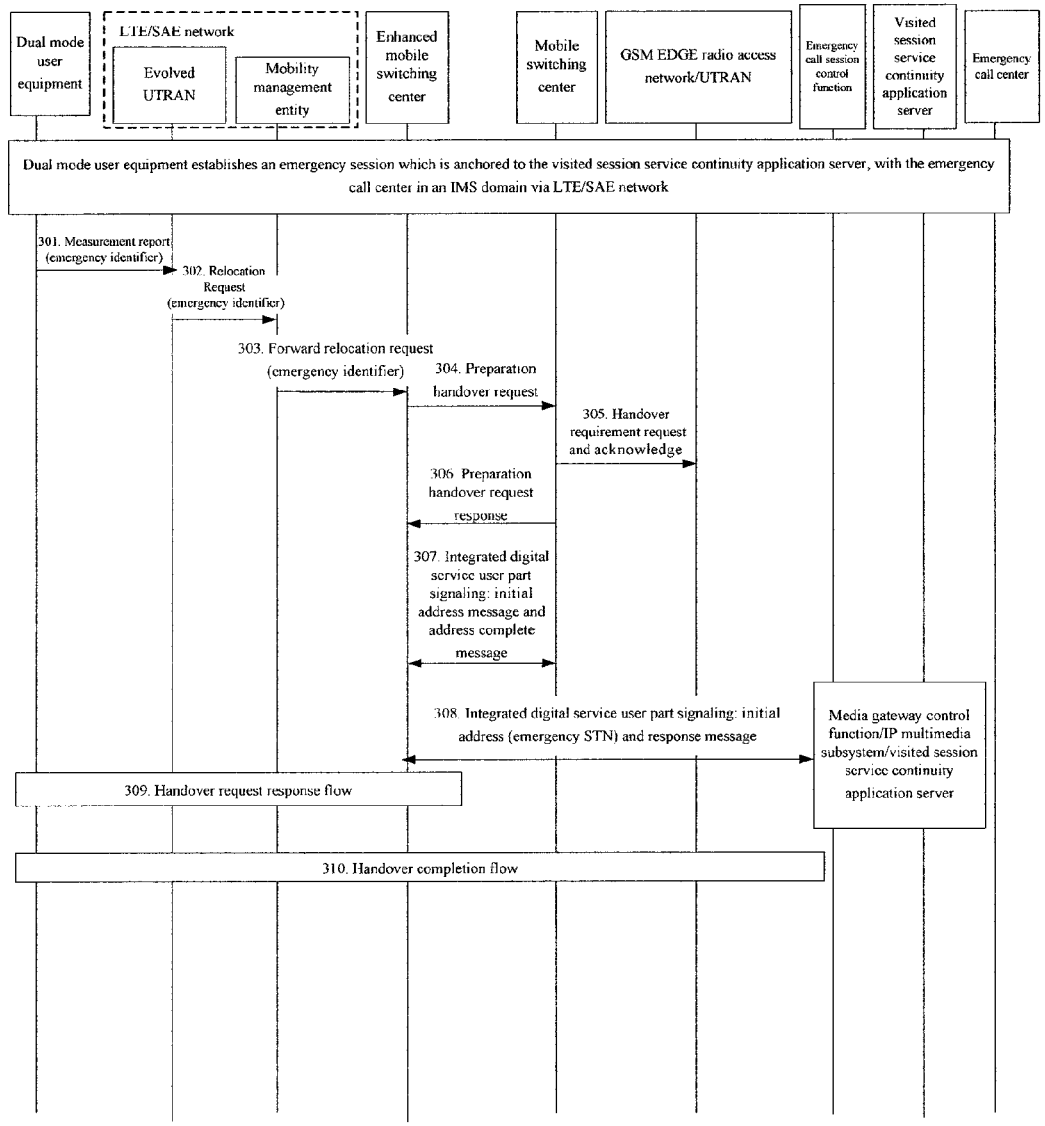
FIG. 3 is a flow chart of embodiment I of the present invention that the emergency service realizes to switch the access from the LTE/SAE network to the access from the CS domain.

FIG. 3 is a flow chart of embodiment 1 of the present invention that the emergency service realizes to switch the access from LTE/SAE network to the access from the CS domain. As shown in FIG. 3, the core idea of the embodiment 1 that the emergency service realizes to switch the access from the LTE/SAE network to the access from the CS domain is as follows: an emergency STN corresponding to the SCC AS in the visited location is preset in the enhanced MSC or the MME; the emergency STN has two functions, wherein one is for the emergency handover, and the other one is for routing to the SCC AS in the visited location; after receiving a measurement request from a radio system, the UE sends a measurement report to the radio system, and makes an emergency identifier carried in the measurement report; the radio system carrying the emergency identifier sends a handover request to the enhanced MSC via the MME; the enhanced MSC notifies the visited SCC AS in the visited IMS domain to perform the handover from the IMS domain to the CS domain on a service layer by using the emergency STN according to the emergency identifier.

The method that the emergency service realizes to switch the access from the LTE/SAE network to the access from the CS domain according to the embodiment mainly comprises the following steps (step S301-step S310):

Step S301, after receiving a measurement request sent by the radio network element E-UTRAN of the LTE/SAE, the UE sends a measurement report to the E-UTRAN, wherein the measurement report message carries an emergency identifier which represents that what the UE performs is an emergency service, and the measurement report herein also carries adjacent cell information;

Step S302, the E-UTRAN initiates a relocation request message to the MME according to the adjacent cell information in the measurement report for notifying to initiate handover; the relocation request message carries the adjacent cell information, wherein the E-UTRAN also carries the emergency identifier which represents that what the UE performs is an emergency service;

Step S303, the MME sends a forward relocation request message to the enhanced MSC according to the information in the relocation request message, wherein the message carries the emergency identifier which represents that what the UE performs is an emergency service;

the enhanced MSC further adds the emergency identifier described in the step S303 to the adjacent cell message; the bearer type of the session carried in the MAP preparation handover request message is an emergency type, that is, when the handover establishes the bearer, the common bearers of other sessions can be occupied;

in case the emergency STN is configured by the MME, the relocation request message will carry the emergency STN;

Step S304, the MAP preparation handover request message is sent to the MSC;

Step S305, the MSC sends a handover request message to the GERAN/UTRAN, and the GERAN/UTRAN replies the handover request acknowledge message to the MSC;

Step S306, the MSC replies the MAP preparation handover request acknowledge message to the enhanced MSC; the message carries a transfer number (HO#) allocated by the MSC;

Step S307, the enhanced MSC sends an initial address message of the ISDN user part (ISUP) signaling to the MSC, and the MSC replies an address complete message of the ISUP to the enhanced MSC;

in case the enhanced MSC is integrated with the MSC, that is, in the case of switching to the enhanced MSC without switching to other MSC, steps S304, S306 and S307 are not performed;

Step S308, after establishing the bearer connection with the target MSC and the target GERAN/UTRAN or the bearer connection with the target GERAN/UTRAN, the enhanced MSC will send an initial address message of the ISUP to the SCC AS in the visited location via the MGCF and the E-CSCF in the IMS domain in case the handover is determined as to be about the emergency call according to the emergency identifier received in step S303, wherein the message carries the emergency STN in the enhanced MSC; the visited SCC AS replies a successful response to the enhanced MSC, that is, SCC AS replies an SIP successful message (such as SIP: 200 OK) to the MGCF, and the MGCF replies a response message of the ISUP to the enhanced MSC;

or the enhanced MSC directly sends an SIP session request message to the visited SCC AS, wherein the message carries the emergency STN in the enhanced MSC; the visited SCC AS replies the SIP successful message (such as SIP: 200 OK) to the enhanced MSC;

the emergency STN can be configured by the enhanced MSC, and also can be configured by the MME; in case the emergency STN is configured by the MME, the relocation request message will be sent to the enhanced MSC according to the step S303;

that is to say, according to the initial address message of the ISUP in this step or the SIP session request message which the enhanced MSC directly sends to the visited SCC AS, the enhanced MSC makes the representation of initiating the emergency service handover request to the visited SCC AS to request the handover of the emergency service from the IMS domain to the CS domain on a service layer;

Step S309, the enhanced MSC sends a handover response message via the UE and the detailed descriptions thereof can be obtained by referring to S209-S211 in the background of the invention;

Step S310, the UE accesses the target GERAN/UTRAN, at this moment the handover is completed, and the detailed descriptions thereof can be obtained by referring to S212-S218 in the background of the invention.

Figure 4:
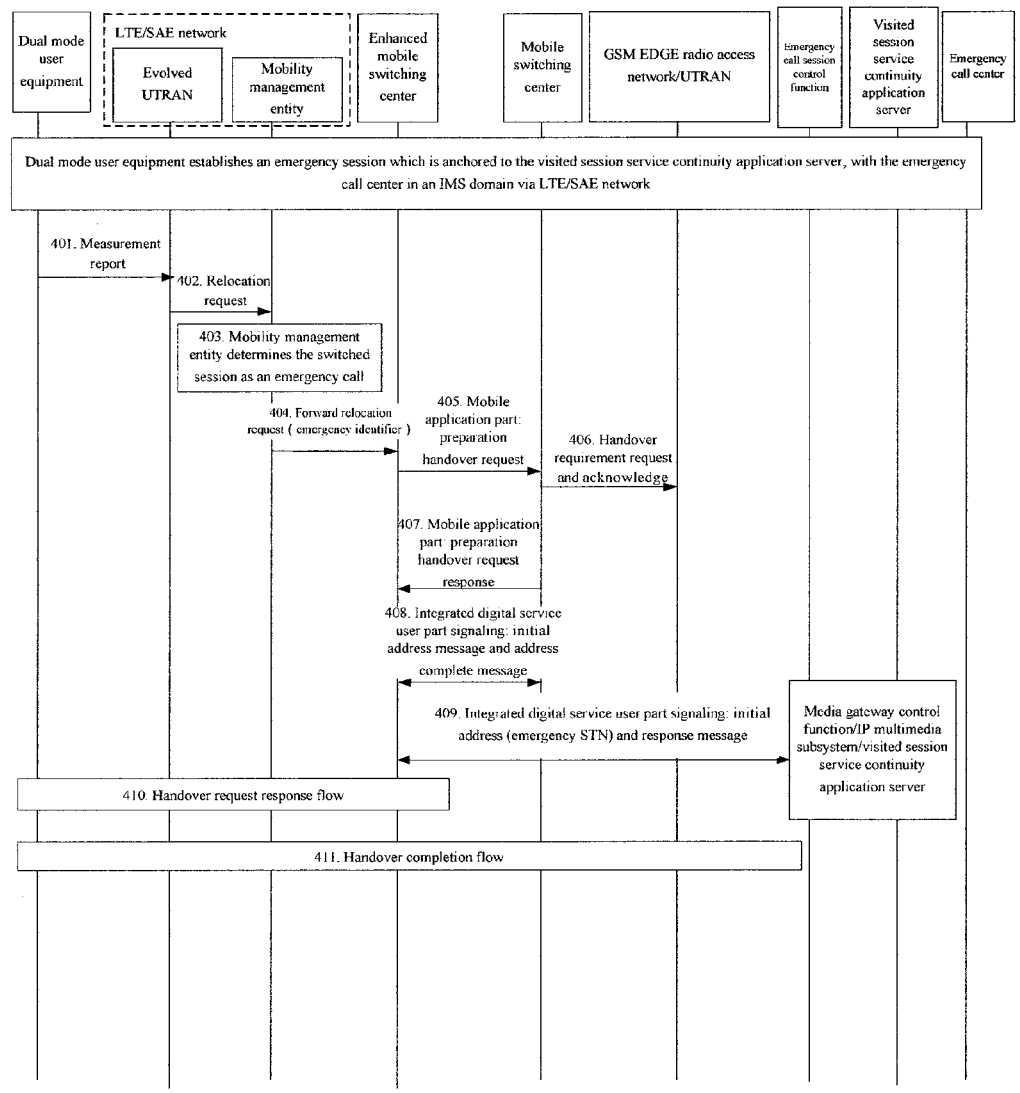
FIG. 4 is a flow chart of embodiment II of the present invention that the emergency service realizes to switch the access from the LTE/SAE network to the access from the CS domain.

FIG. 4 is a flow chart of embodiment II of the present invention that the emergency service realizes to switch the access from the LTE/SAE network to the access from the CS domain. As shown in FIG. 4, the difference of the embodiment compared with that of in FIG. 3 lies in that the emergency call is determined no longer according to the emergency call identifier carried in the measurement information of the UE, but is determined by the MME itself. The prerequisite of the embodiment of the present invention is that the UE establishes an emergency session in the IMS domain with an emergency call center via the LTE/SAE network, where the session is anchored to the SCC AS in the visited location. The method mainly comprises the following steps (S401-S411):

Step S401, after receiving a measurement request of the LTE/SAE radio network element, E-UTRAN, the UE sends a measurement report which carries the adjacent cell information;

Step S402, the E-UTRAN initiates a relocation request message to the MME according to the adjacent cell information in the measurement report;

Step S403, the MME determines the session which needs to be switched as an emergency service according to the condition that the session bearer is an emergency bearer or the bearer information obtained from the policy server is a emergency service;

Step S404, the MME sends a forward relocation request message to the enhanced MSC, wherein the message carries an emergency identifier which represents that what the UE performs is an emergency service; further, the enhanced MSC adds the emergency identifier in the step S404; the bearer type of the session carried in an MAP preparation handover request message is an emergency type, that is, when the handover establishes the bearer, common bearers of other sessions can be occupied;

the enhanced MSC also can obtain the emergency identifier from MME via other information;

in case the emergency STN is allocated by the MME, the relocation request message will carry the emergency STN;

Step S405, the enhanced MSC sends the MAP prepare handover request message to the MSC;

Step S406, the MSC sends a handover requirement message to the GERAN/UTRAN, and the GERAN/UTRAN replies a handover requirement acknowledge message to the MSC;

Step S407, the MSC replies an MAP preparation handover request acknowledge message to the enhanced MSC, wherein the message carries a transfer number (HO#) which is allocated by the MSC;

Step S408, the enhanced MSC sends an initial address message of the ISDN user part (ISUP for short) signaling to the MSC according to the transfer number, and the MSC replies an address complete message of the ISUP to the enhanced MSC;

in case the enhanced MSC and the MSC are integrated with each other, that is, in the case of switching into the enhanced MSC without switching to other MSC, the Steps S405, S407 and S408 will not be carried out;

Step S409, after establishing a bearer connection with the target MSC and the target GERAN/UTRAN or a bearer connection with the target GERAN/UTRAN, the enhanced MSC sends an initial address message of the ISUP to the SCC AS in the visited location via the MGCF and the E-CSCF in the IMS domain in case the handover is determined as to be about the emergency call according to the emergency identifier received in step S404, wherein the message carries the emergency STN in the enhanced MSC; the visited SCC AS replies a successful response to the enhanced MSC, that is, SCC AS replies an SIP successful message (such as SIP: 200 OK) to the MGCF, and the MGCF replies a response message of the ISUP to the enhanced MSC;

or the enhanced MSC directly sends an SIP session request message to the visited SCC AS, wherein the message carries the emergency STN in the enhanced MSC; the visited SCC AS replies an SIP successful message (such as SIP: 200 OK) to the enhanced MSC;

the emergency STN can be allocated by the enhanced MSC, and also can be allocated by the MME; in case the emergency STN is allocated by the MME, the relocation request message will be sent to the enhanced MSC according to the step S404;

that is to say, according to the initial address message of the ISUP of present step or according to sending directly by the enhanced MSC the SIP session request message to the visited SCC AS, the enhanced MSC makes the representation of initiating the emergency service handover request to the visited SCC AS to request the handover of the emergency service from the IMS domain to the CS domain on a service layer;

Step S410, the enhanced MSC sends a handover response message via the UE and the detailed descriptions thereof can be obtained by referring to the steps S209-S211 in the background of the invention;

Step S411, the UE accesses the target GERAN/UTRAN and the handover is completed; the detailed descriptions thereof can be obtained by referring to the steps S212-S218 in the background of the invention.

Figure 5:
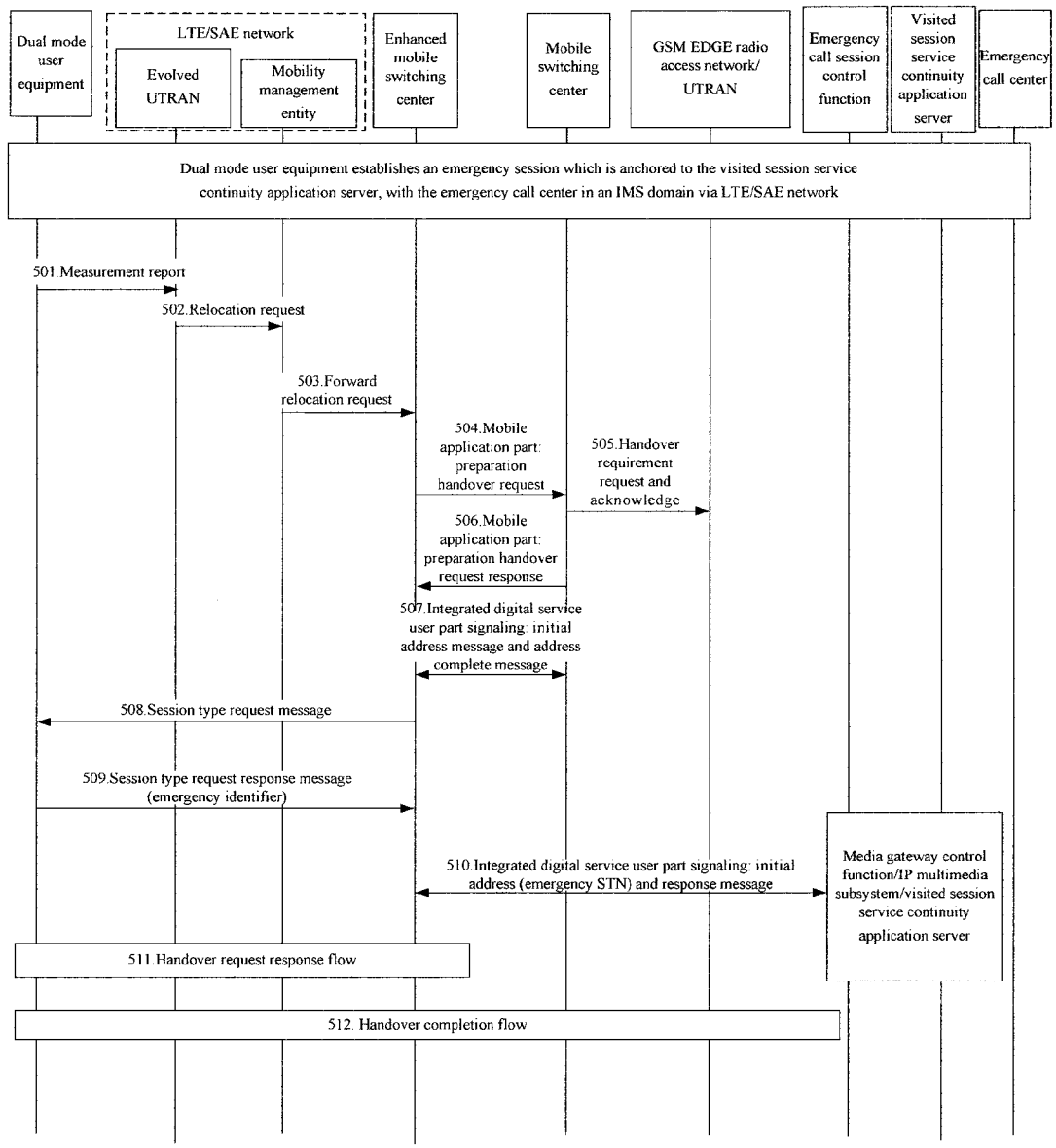
FIG. 5 is a flow chart of embodiment III of the present invention that the emergency service realizes to switch the access from the LTE/SAE network to the access from the CS domain.

FIG. 5 is a flow chart of the present invention that the emergency service realizes to switch the access from the LTE/SAE network to the access from the CS domain. As shown in FIG. 5, the difference of the flow compared with that of in FIG. 3 lies in that the enhanced MSC determines the type of the emergency call in the manner of obtaining the information of the call type from the terminal. The prerequisite of the embodiment of the present invention is as follows: the UE established an emergency session in the IMS domain with an emergency call center via the LTE/SAE network, and the session is anchored to the SCC AS in the visited location. The method mainly comprises the following steps (S501-S512):

Step S501, after receiving a measurement request of the LTE/SAE radio network element, E-UTRAN, the UE sends the measurement report to the E-UTRAN, wherein the measurement report carries adjacent cell information;

Step S502, the E-UTRAN initiates a relocation request message to the MME according to the adjacent cell information in the measurement report;

Step S503, the MME initiates a forward relocation request message to the enhanced MSC according to the information of the relocation request message;

in case an emergency STN is allocated by the MME, the relocation request message will carry the emergency STN;

Step S504, the enhanced MSC sends an MAP preparation handover request message to the MSC;

Step S505, the MSC sends a handover requirement message to the GERAN/UTRAN, and the GERAN/UTRAN replies a handover requirement acknowledge message to the MSC;

Step S506, the MSC replies an MAP preparation handover request acknowledge message to the enhanced MSC, wherein the message carries a transfer number (HO#) which is allocated by the MSC;

Step S507, the enhanced MSC sends an initial address message of the ISDN user part (ISUP for short) signaling to the MSC via the transfer number, and the MSC replies an address complete message of the ISUP to the enhanced MSC;

in case the enhanced MSC and the MSC are integrated with each other, that is, in the case of switching the enhanced MSC without switching to other MSC, Steps S504, S506 and S507 will not be performed;

Step S508, the enhanced MSC initiates a session type request message to the UE directly or via the MME;

Step S509, the UE replies a session type request response message to the enhanced MSC, wherein the message carries an emergency identifier which represents that what the UE performs is an emergency service;

the enhanced MSC can simultaneously carry out steps S504-S507 and steps S508-S509, and also can carry out successively;

Step S510, after establishing the bearer connection with the target MSC and the target GERAN/UTRAN or the bearer connection with the target GERAN/UTRAN, the enhanced MSC will send an initial address message of the ISUP to the SCC AS in the visited location via the MGCF and the E-CSCF in the IMS domain in case the enhanced MSC determines the handover as to be about the emergency call according to the emergency identifier received in step S509, wherein the message carries the emergency STN in the enhanced MSC; the visited SCC AS replies a successful response to the enhanced MSC, that is, SCC AS replies a SIP successful message (such as SIP: 200 OK) to the MGCF, and the MGCF replies a response message of the ISUP to the enhanced MSC;

or the enhanced MSC directly sends an SIP session request message to the visited SCC AS, wherein the message carries the emergency STN in the enhanced MSC; the visited SCC AS replies an SIP successful message (such as SIP: 200 OK) to the enhanced MSC;

the emergency STN can be allocated by the enhanced MSC, and also can be allocated by the MME; in case the emergency STN is allocated by the MME, the relocation request message carrying the emergency STN will be sent to the enhanced MSC according to the step S503;

that is to say, according to the initial address message of the ISUP of present step or according to sending directly by the enhanced MSC the SIP session request message to the visited SCC AS, the enhanced MSC makes the representation of initiating the emergency service handover request to the visited SCC AS to request the handover of the emergency service from the IMS domain to the CS domain on a service layer;

Step S511, the enhanced MSC sends a handover response message via the UE, wherein the detailed descriptions thereof can be obtained by referring to the description of steps S209-S211 in the background of the invention.

Step S512, the UE accesses the target GERAN/UTRAN and the handover is completed, wherein the detailed descriptions thereof can be obtained by referring to the description of steps S212-S218 in the background of the invention.

Figure 6:
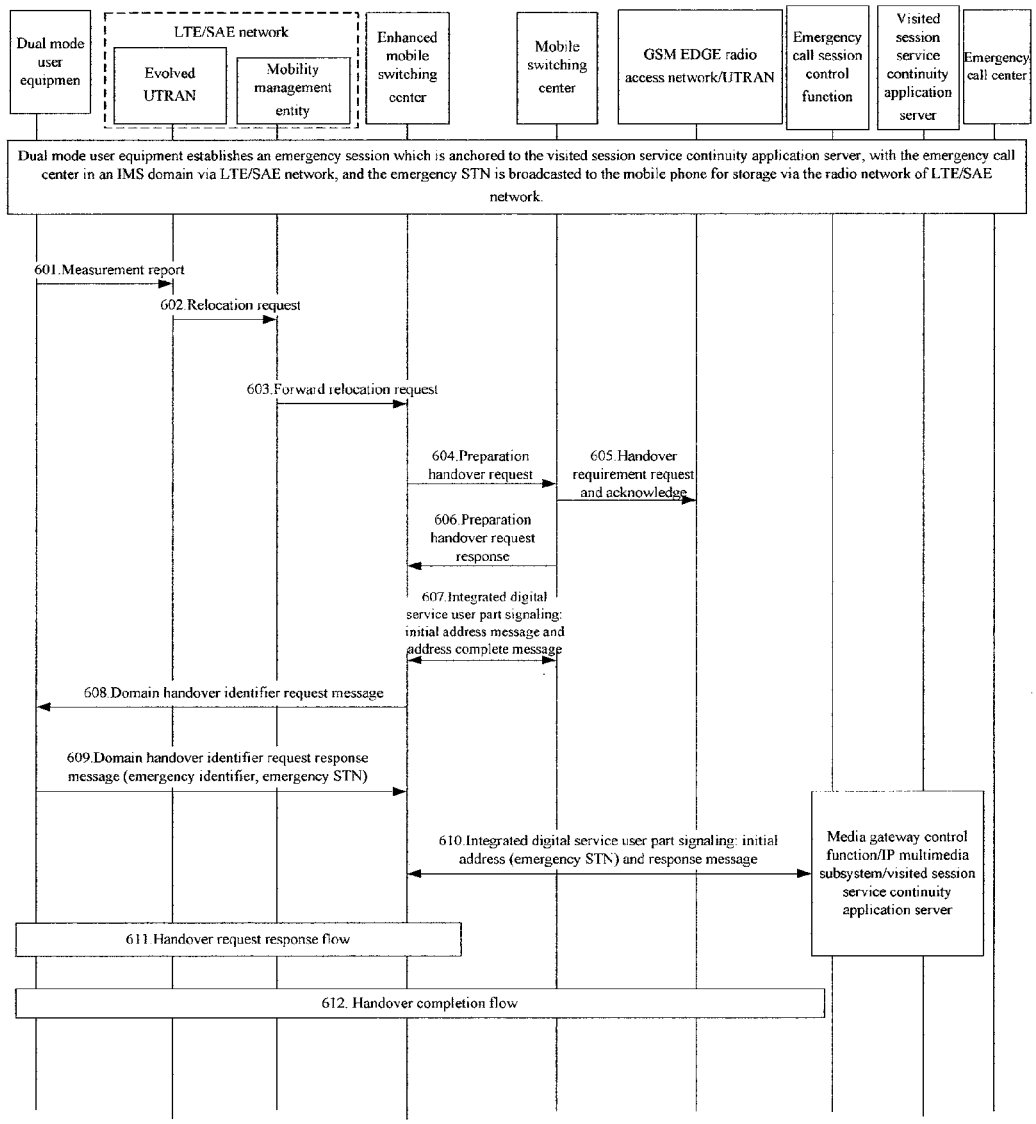
FIG. 6 is a flow chart of embodiment IV of the present invention that the emergency service realizes to switch the access from the LTE/SAE network to the access from the CS domain.

FIG. 6 is a flow chart of the present invention that the emergency service realizes to switch the access from the LTE/SAE network to the access from the CS domain. As shown in FIG. 6, the difference of the flow compared with that of in FIG. 3 lies in that the enhanced MSC determines the type of the emergency call in the manner of obtaining the call type information and the emergency STN from the terminal. The prerequisite of the embodiment of the present invention is as follows: the UE establishes an emergency session in the IMS domain with an emergency call center via the LTE/SAE network, wherein the session is anchored to the SCC AS in the visited location and the emergency STN is broadcast to mobile phone to be stored by the radio network of the LTE/SAE network. The method mainly comprises the following steps (S601-S612):

Step S601, after receiving a measurement request of the LTE/SAE radio network element, the E-UTRAN, the UE sends a measurement report to the E-UTRAN, wherein the measurement report carries the adjacent cell information;

Step S602, the E-UTRAN initiates a relocation request message to the MME according to the adjacent cell information in the measurement report;

Step S603, the MME initiates a forward relocation request message to the enhanced MSC according to the information of the relocation request message.

Step S604, the enhanced MSC sends an MAP preparation handover request message to the MSC;

Step S605, the MSC sends a handover requirement message to the GERAN/UTRAN, and the GERAN/UTRAN replies the handover requirement acknowledge message to the MSC;

Step S606, the MSC replies an MAP preparation handover request acknowledge message to the enhanced MSC, wherein the message carries a transfer number (HO#) which is allocated by the MSC;

Step S607, the enhanced MSC sends an initial address message of the ISDN user part (ISUP for short) signaling to the MSC via the transfer number, and the MSC replies the ISUP address complete message to the enhanced MSC;

in case the enhanced MSC and the MSC are integrated with each other, that is, in the case of switching to the enhanced MSC without switching to other MSC, Steps S604, S606 and S607 will not be performed;

Step S608, the enhanced MSC initiates a domain handover identifier request message to the UE directly or via the MME;

Step S609, the UE replies a domain handover identifier request response message the enhanced MSC, wherein the message carries the emergency identifier which represents that what the UE performs is the emergency service, and the message also carries the emergency STN;

the enhanced MSC can simultaneously or successively carry out steps S604-S607 and steps S608-S609;

Step S610, after establishing the bearer connection with the target MSC and the target GERAN/UTRAN or the bearer connection with the target GERAN/UTRAN, the enhanced MSC will send an initial address message of the ISUP to the SCC AS in the visited location via the MGCF and the E-CSCF in the IMS domain in case the enhanced MSC determines the handover as to be about the emergency call according to the emergency identifier received in step S609, wherein the message carries the emergency STN; the visited SCC AS replies a successful response to the enhanced MSC, that is, SCC AS replies an SIP successful message (such as SIP: 200 OK) to the MGCF, and the MGCF replies an ISUP response message to the enhanced MSC;

or the enhanced MSC directly sends the SIP session request message to the visited SCC AS, where the message carries the emergency STN in the enhanced MSC; the visited SCC AS replies the SIP successful message (such as SIP: 200 OK) to the enhanced MSC;

that is to say, according to the initial address message of the ISUP of present step or according to sending directly by the enhanced MSC the SIP session request message to the visited SCC AS, the enhanced MSC makes the representation of initiating the emergency service handover request to the visited SCC AS to request the handover of the emergency service from the IMS domain to the CS domain on a service layer;

Step S611, the enhanced MSC sends a handover response message via the UE and the detailed descriptions thereof can be obtained by referring to steps S209-S211 in the background of the invention;

Step S612, the UE accesses the target GERAN/UTRAN and the handover is completed; the detailed descriptions thereof can be obtained by referring to steps S212-S218 in the background of the invention.

To sum up, the enhanced MSC chooses to use the emergency STN according to the emergency identifier, so as to ensure the continuity of the emergency service in the visited domain, and to not make the problem that the SCC AS in the home domain can not recognize the session to make the handover failed, of which the reason is that the bearer of the handover is wrongly established into the SCC AS in the home domain due to using the STN obtained from the HSS in the home domain.

Obviously, those skilled in the art shall understand that the above-mentioned modules and steps of the present invention can be realized by using general calculating device, can be integrated in one calculating device or distributed on a network which consists of a plurality of calculating devices. Alternatively, the modules and the step of the present invention can be realized by using the executable program code of the calculating device. Consequently, the steps can be stored in the storage device and executed by the calculating device, or can be made into integrated circuit module respectively, or a plurality of steps thereof can be made into one integrated circuit module. In this way, the present invention is not restricted to any particular hardware and software combination.

The descriptions above are only preferable embodiments of the present invention, which are not used to restrict the present invention. For those skilled in the art, the present invention may have various changes and variations. Any amendments, equivalent substitutions, improvements etc. within the spirit and principle of the present invention are all concluded in the scope of protection of the present invention.

What is claimed is:

1. An emergency service handover method which is applied in a single radio voice system, with a user terminal UE having established an emergency session between a multimedia subsystem (IMS) domain and an emergency call center via LTE/SAE network, and the emergency session anchored to a service centralization and continuity application server (SCC AS) of a visited location, and the method comprising the following step:

initiating, by an enhanced MSC, a session establishment request to the visited SCC AS for performing a handover from the IP multimedia subsystem domain to the circuit switched domain on a service layer when the enhanced mobile switching center (MSC) obtains information that a UE having established an emergency session needs to be switched to a CS domain, wherein an emergency session transfer number (STN) corresponding to the SCC AS in the visited location is preset in the enhanced MSC; and the enhanced MSC initiates the session establishment request to the visited SCC AS according to the emergency STN.

2. The method according to claim 1, wherein in the process of switching from the IP multimedia subsystem domain to the circuit switched domain on the service layer, the enhanced MSC notifies a MSC of the CS domain via an emergency identifier that the handover is a handover regarding an emergency call.

3. The method according to claim 1, wherein the enhanced MSC is an independent network element or is integrated with the MSC.

4. The method according to claim 1, wherein the step that the enhanced MSC obtains the information that the UE having established the emergency session needs to be switched to the CS domain comprises:

the user terminal (UE) sends the domain handover session information, which carries an emergency identifier, to a mobility management entity (MME) via an evolved universal terrestrial radio access network (E-UTRAN); and
    the MME sends the domain handover session information which carries the emergency identifier to the enhanced MSC.

5. The method according to claim 1, wherein the step that the enhanced MSC obtains the information that the UE having established the emergency session needs to be switched to the CS domain comprises:

receiving the session handover request from the UE, and determining, by the MME, that the session to be switched is an emergency service based on the condition that the session bearer is an emergency bearer or the bearer information obtained from a policy server is an emergency service, adding an emergency handover identifier in the handover request and forwarding the handover request to the enhanced MSC.

6. The method according to claim 1, wherein the step that the enhanced MSC obtains the information that the UE having established the emergency session needs to be switched to the CS domain comprises:

initiating, by the enhanced MSC, a session type request message to the UE directly or via the MME when receiving information of a relocation request message from an MME; and
    returning, by the UE, a session type request response message, which carries an emergency identifier, to the enhanced MSC.

7. The method according to claim 1, wherein, the method further comprises:

sending, by the LTE/SAE network, an emergency STN of the visited SCC AS to the UE via broadcast before the enhanced MSC obtains the information that the UE having established the emergency session needs to be switched to the CS domain;
    initiating, by the enhanced MSC, a session type request message to the UE directly or via the MME when receiving information of a relocation request message from an MME; and
    returning, by the UE, a session type request response message, which carries an emergency identifier and an emergency STN, to the enhanced MSC.

8. The method according to claim 2, wherein the step that the enhanced MSC obtains the information that the UE having established the emergency session needs to be switched to the CS domain comprises:

the user terminal (UE) sends the domain handover session information, which carries an emergency identifier, to a mobility management entity (MME) via an evolved universal terrestrial radio access network (E-UTRAN); and
    the MME sends the domain handover session information which carries the emergency identifier to the enhanced MSC.

9. The method according to claim 3, wherein the step that the enhanced MSC obtains the information that the UE having established the emergency session needs to be switched to the CS domain comprises:

the user terminal (UE) sends the domain handover session information, which carries an emergency identifier, to a mobility management entity (MME) via an evolved universal terrestrial radio access network (E-UTRAN); and the MME sends the domain handover session information which carries the emergency identifier to the enhanced MSC.

10. The method according to claim 2, wherein the step that the enhanced MSC obtains the information that the UE having established the emergency session needs to be switched to the CS domain comprises:

receiving the session handover request from the UE, and determining, by the MME, that the session to be switched is an emergency service based on the condition that the session bearer is an emergency bearer or the bearer information obtained from a policy server is an emergency service, adding an emergency handover identifier in the handover request and forwarding the handover request to the enhanced MSC.

11. The method according to claim 3, wherein the step that the enhanced MSC obtains the information that the UE having established the emergency session needs to be switched to the CS domain comprises:

receiving the session handover request from the UE, and determining, by the MME, that the session to be switched is an emergency service based on the condition that the session bearer is an emergency bearer or the bearer information obtained from a policy server is an emergency service, adding an emergency handover identifier in the handover request and forwarding the handover request to the enhanced MSC.

12. The method according to claim 3, wherein the step that the enhanced MSC obtains the information that the UE having established the emergency session needs to be switched to the CS domain comprises:

initiating, by the enhanced MSC, a session type request message to the UE directly or via the MME when receiving information of a relocation request message from an MME; and returning, by the UE, a session type request response message, which carries an emergency identifier, to the enhanced MSC.

13. An emergency service handover method which is applied in a single radio voice system, with a user terminal UE having established an emergency session between a multimedia subsystem (IMS) domain and an emergency call center via LTE/SAE network, and the emergency session anchored to a service centralization and continuity application server (SCC AS) of a visited location, and the method comprising the following step:

initiating, by an enhanced MSC, a session establishment request to the visited SCC AS for performing a handover from the IP multimedia subsystem domain to the circuit switched domain on a service layer when the enhanced mobile switching center (MSC) obtains information that a UE having established an emergency session needs to be switched to a CS domain, wherein an emergency session transfer number (STN) corresponding to the SCC AS in the visited location is preset in an MME, the emergency session transfer number (STN) is sent to the enhanced MSC in a handover request, and the enhanced MSC initiates the session establishment request to the visited SCC AS according to the emergency STN.

* * * * *